United States Patent [19]

Cowles

[11] E Patent Number: Re. 33,314

[45] Reissued Date of Patent: Aug. 28, 1990

[54] VENDING MACHINE POWER SWITCHING APPARATUS

[75] Inventor: John C. Cowles, Bensalem, Pa.

[73] Assignee: Mars Incorporated, McLean, Va.

[21] Appl. No.: 71,993

[22] Filed: Jul. 7, 1987

Related U.S. Patent Documents

Reissue of:

[64] Patent No.: 4,604,557
Issued: Aug. 5, 1986
Appl. No.: 659,385
Filed: Oct. 10, 1984

[51] Int. Cl.[5] ..... H02P 7/74

[52] U.S. Cl. ..... 318/98; 221/129; 221/258; 222/63; 361/3

[58] Field of Search ..... 318/98; 194/216; 221/129, 153, 258; 222/63; 307/134, 135, 137; 361/3

[56] References Cited

U.S. PATENT DOCUMENTS

| | | | |
|---|---|---|---|
| 2,958,808 | 11/1960 | Miller . | |
| 3,223,888 | 12/1965 | Kopplemann . | |
| 3,237,030 | 2/1966 | Coburn . | |
| 3,249,810 | 5/1966 | Strom et al. . | |
| 3,279,480 | 10/1966 | Jarvis | 194/216 |
| 3,321,668 | 5/1967 | Baker . | |
| 3,328,606 | 6/1967 | Pinckaers . | |
| 3,330,992 | 7/1967 | Perrins . | |
| 3,339,110 | 8/1967 | Jones . | |
| 3,349,881 | 10/1967 | Camp . | |
| 3,389,301 | 6/1968 | Siwko . | |
| 3,395,316 | 7/1968 | Denes et al. . | |
| 3,402,302 | 9/1968 | Coburn . | |
| 3,408,538 | 10/1968 | Gurwicz . | |
| 3,446,991 | 5/1969 | Howell . | |
| 3,466,503 | 9/1969 | Goldberg . | |
| 3,474,293 | 10/1969 | Siwko et al. . | |
| 3,504,233 | 3/1970 | Hurtle . | |
| 3,529,707 | 9/1970 | Bowman . | |
| 3,539,775 | 11/1970 | Casson . | |
| 3,543,047 | 11/1970 | Renfrew . | |
| 3,555,353 | 1/1971 | Casson . | |
| 3,558,910 | 1/1971 | Dale et al. . | |
| 3,588,605 | 6/1971 | Casson . | |
| 3,609,504 | 9/1971 | Barker et al. . | |
| 3,613,854 | 10/1971 | Bowman . | |
| 3,614,464 | 10/1971 | Chumakov . | |
| 3,633,069 | 1/1972 | Bernard . | |
| 3,639,808 | 2/1972 | Ritzow . | |
| 3,697,774 | 10/1972 | Pascente . | |
| 3,736,466 | 5/1973 | Fox et al. . | |
| 3,783,305 | 1/1974 | Lefferts . | |
| 3,792,766 | 2/1974 | Fougere . | |
| 3,797,307 | 3/1974 | Johnston . | |
| 3,802,542 | 4/1974 | Lamb . | |
| 3,809,959 | 5/1974 | Pucher . | |
| 3,814,115 | 6/1974 | Van Acker . | |
| 3,828,903 | 8/1974 | Levasseur . | |
| 3,841,456 | 10/1974 | Levasseur . | |
| 3,868,549 | 2/1975 | Schaefer et al. . | |
| 3,874,743 | 4/1975 | Fleischer et al. . | |
| 3,891,893 | 6/1975 | Thaler . | |
| 3,982,137 | 9/1976 | Penrod . | |

(List continued on next page.)

FOREIGN PATENT DOCUMENTS

| | | |
|---|---|---|
| 2056728A | 3/1981 | United Kingdom . |
| 2057207A | 3/1981 | United Kingdom . |

OTHER PUBLICATIONS

Oliver, "Practical Relay Cir.", Hayden Book Company, Inc., New York, 1971.

*Primary Examiner*—Bentsu Ro

*Attorney, Agent, or Firm*—Davis, Hoxie, Faithfull & Hapgood

[57] ABSTRACT

An improved vending machine power switching apparatus in which a single power switching circuit is associated with a plurality of load selecting relay switches and a switching control circuit, in which the control circuit controls the order of switching of the power switch and relay switches, such that any relay switch is always closed before power is delivered to its associated load and is always opened after power is removed from the load, and the power is applied and removed by the power switching means.

24 Claims, 4 Drawing Sheets

U.S. PATENT DOCUMENTS 4,001,643 1/1977 Romberg et al. .
4,025,820 5/1977 Penrod .
4,074,333 2/1978 Murakami et al. .
4,090,225 5/1978 Gilker et al. .
4,106,610 8/1978 Heiman .
4,152,634 5/1979 Penrod .
4,156,885 5/1979 Baker et al. .
4,173,029 10/1979 Rabindran .
4,220,235 9/1980 Lindsey et al. .
4,225,056 9/1980 Flubacker .
4,231,105 10/1980 Schuller et al. .
4,234,070 11/1980 Heiman .
4,251,845 2/1981 Hancock .
4,284,208 8/1981 Levasseur ..... 221/258 X
4,288,726 9/1981 Vasquez-Cuervo et al. .
4,296,449 10/1981 Eichelberger .
4,313,063 1/1982 Metlerron .
4,321,447 3/1982 Lamb .
4,328,539 5/1982 Heeger .
4,354,613 10/1982 Desai et al. .
4,354,616 10/1982 Camp ..... 221/129 X
4,356,525 10/1982 Kornrumpf et al. .
4,359,147 11/1982 Levasseur .
4,367,760 1/1983 Thomas et al. .
4,372,464 2/1983 Otten .
4,389,691 6/1983 Hancock .
4,438,472 3/1984 Woodworth ..... 307/134 X
4,458,187 7/1984 Heiman .
4,463,446 7/1984 Shah et al. .
4,478,355 10/1984 Houman ..... 222/63 X
4,504,773 3/1985 Suzuki et al. .
4,512,453 4/1985 Schuller et al. .
4,525,762 6/1985 Norris .
4,550,356 10/1985 Takahasi .
4,636,907 1/1987 Howell ..... 307/137 X
4,712,049 12/1987 Houseman ..... 318/112

VENDING MACHINE POWER SWITCHING APPARATUS

Matter enclosed in heavy brackets [ ] appears in the original patent but forms no part of this reissue specification; matter printed in italics indicates the additions made by reissue.

BACKGROUND OF THE INVENTION

1. Field of Invention

This invention relates to an improved vending machine power switching apparatus, and particularly to vending machines and coin mechanisms having a plurality of relays for selecting which of a plurality of loads is to be energized.

2. Description of the Prior Art

Vending machines include a wide variety of coin operated machines such as cigarette, coffee, soda, candy and ticket dispensing machines, as well as, juke boxes, pinball machines and the like. Typically, vending machines employ relays for a wide variety of switching functions.

A relay is a commonly known electrical component which may be broadly defined as an electrically controlled device that opens and closes electrical contacts to effect the operation of other devices in the same or another electrical circuit. Typically, a relay incorporates an electromagnet, to which a controlling current is applied, which moves electrical contacts to switch the controlled current. As with any electrical components, the designer or manufacturer who employs relays in a system is faced with the task of minimizing the cost of the components used while still achieving the desired reliability and durability in the system.

Although alternative switching devices, especially semiconductor devices, are available and have been successfully used in vending machines, electromechanical relays are still preferred for many applications because the use of an electromagnet provides electrical isolation between the controlling and controlled currents, and because a single controlling current and electromagnet can control a plurality of circuits with a plurality of switching contacts. In the case of the common power-controlling semiconductor devices (such as SCR's, triacs and power transistors,) a separate isolation device (such as an opto-isolator) would be required and each power controlling device can open and close only one circuit. A further advantage of relays is that they are not subject to random turn-on due to random noise spikes.

One of the basic problems in designing vending systems with relays is the problem of contact deterioration or degradation due to arcing, fine metal transfer, and microscopic point welding which occurs when the relay contacts open or close a circuit in which current is flowing. For a general discussion of arcing and like phenomenon, see Frank S. Oliver, Practical Relay Circuits, Ch. 2 (1971). Thus, the principal rating of relays is current switching capacity.

The contact degradation problem is exacerbated where a relay is used to switch power to an inductive load. In conventional vending machines, relays are frequently used for switching current to inductive loads such as motors, solenoids and other relays. Some of the many functions of vending machines where power is switched to an inductive load are illustrated by the following U.S. Patents assigned to the assignee of the present invention: U.S. Pat. No. 3,792,766 (solenoid used in magnetic coin eliminator), U.S. Pat. No. 3,797,307 (solenoid retracts arrest pin), U.S. Pat. Nos. 3,814,115 and 4,367,760 (actuator operates slide plate for dispensing coins to be returned as change), U.S. Pat. No. 4,106,610 (actuators activate gates for directing coins through coin mechanism) and U.S. Pat. Nos. 4,234,070 and 4,458,187 (actuators dispense customer selected products).

Relay manufacturers have devoted extensive work over the years to produce contacts which, for a given size, are less prone to deterioration from switching current. Vending machine designers, concerned with long term reliability, have incorporated special protective circuitry to [supress] *suppress* contact arcing. This response to the problem is not fully satisfactory where large numbers of relay are required because the provision of protective circuits for each relay and the cost for the relays used becomes quite expensive.

SUMMARY OF THE INVENTION

The present invention provides an improved relay switching arrangement which is useful where two or more relays are used to selectively switch power to two or more loads. According to the present invention, a single heavy duty power switching device (such as a relay, SCR, triac or power transistor) together with arc suppression curcuitry or other transient control circuitry, if appropriate, is used in series with the switching contacts of a plurality of relays which are not required to be operated simultaneously. These relays are of smaller capacity and less expensive than the relays which would normally be used. Each of the smaller relays is associated with its own load or loads, such as a dispensing motor or a solenoid for operating a coin directing gate, for example, and is used to select its load. These relays are not used to start and stop the flow of current. Power switching to the load or loads selected by the relays is controlled by the power switching device. As a result, significant cost saving and improved relay lifetime are achieved.

In accordance with the present invention, only one power switching device is required for each group of nonconcurrently operated loads, of which there are many in vending machines. For example, only one product is dispensed in each machine cycle from the typical snack, candy or cigarette vending machine; therefore, a single power switching means can control the power switching for all of the product dispensing actuators. A single switching means can also be employed for a plurality of operations which occur in sequence, for example in a drink vending machine, the same switching means can be used with separate relays to actuate dispensing a cup, dispensing ice and dispensing the product. Where concurrent operations are required, such as concurrent dispensing of soda water and soft drink syrup, two switching means can be employed to control separate groups of relays. Of course, when two operations are simultaneous, always starting and stopping at the same time, only a single switching means and a single relay is required.

DESCRIPTION OF THE INVENTION

Figure 1:
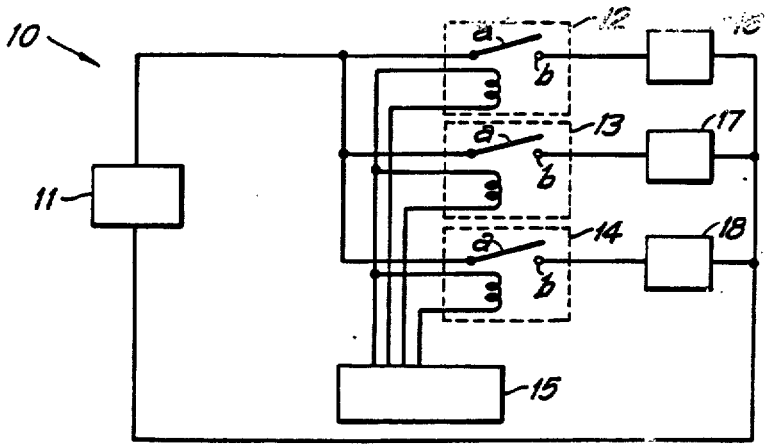
(PRIOR ART) FIG.1
FIG. 1 is a block diagram of a simplified prior art relay switching arrangement found in vending machines.

In the simplified prior art arrangement 10 shown in FIG. 1, a power source 11 is connected to a plurality of relays 12, 13, and 14 having normally open contacts a,b. The relays 12–14 are controlled by a control means 15, such as a microprocessor control circuit. Each of the relays 12–14 is also connected to a reserve load 16–18. When control means 15 causes a relay, for example, relay 13, to close its contacts a,b, current flows through the contacts a,b of relay 13 from power source 11 to its associated load 17. The other relays 12 and 14 operate similarly in conjunction with loads 16 and 18, respectively. Each of the relays 12–14 serves both a load selection function and a power switching function. Each of the relays 12–14 must be designed to withstand the transient conditions occurring during the marking and breaking (i.e., the opening and closing) of the relay contacts. Such transient conditions are particularly severe where the loads 16–18 are inductive loads such as the solenoids or dispensing motors commonly found in vending machines.

Figure 2:
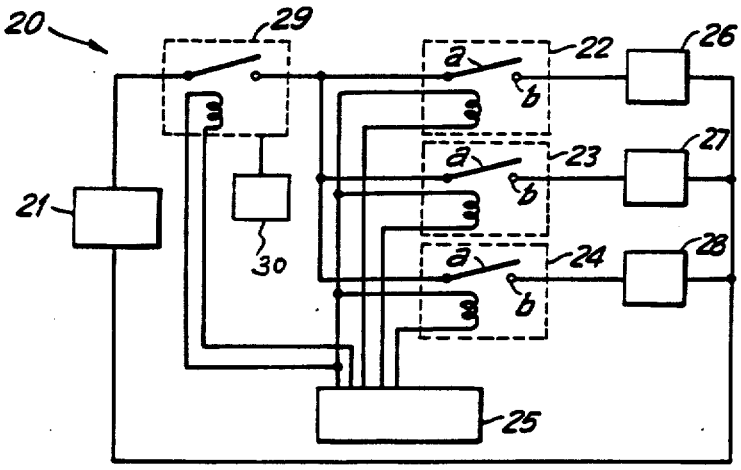
FIG. 2 is a block diagram showing the principle of an improved vending machine power switching apparatus for purposes of illustrating the present invention.
Figure 3:
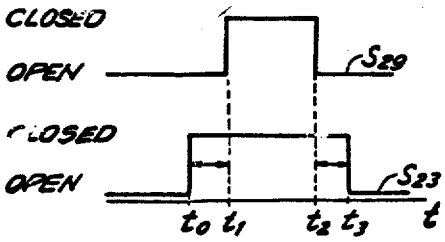
FIG. 3 is a graph illustrating the proper order of switching of the vending machine power switching apparatus of FIG. 2 according to the present invention.

FIG. 2 shows a block diagram of an improved vending machine power switching apparatus 20 which, in conjunction with the graph of FIG. 3, illustrates the principle of the present invention. In FIG. 2, a power source 21 is shown connected to a power switching device 29, shown here as a relay. The power switching device 29 is connected to a plurality of relays 22–24 which are in turn connected to a plurality of loads 26–28 (Although three relays and three loads are shown it should be clear that a greater number of relays can be employed without departing from the invention). All of the relays 22–24 are shown with their contacts a,b normally open and are controlled by a control means 25, such as a microprocessor control circuit. The control means 25 controls the switching of the various relays 22–24 and the power switching device 29 so that relays 22–24 provide a selection function, but do not do power switching, and the power switching device 29 switches the power on or off at the appropriate times. In other words, in this arrangement, the power switching and the load selection functions have been separated.

If it is desired to switch power to the load 17, according to the arrangement of FIG. 1, it is only necessary to close a single relay 13 to energize its associated load. To apply power to a load, for example, load 27 in the apparatus of FIG. 2 according to the present invention, relay 23 and power switching device 29 must be switched to their closed positions by the relay control means 25 in the order shown in FIG. 3. Line $S_{23}$ shows the switching times for relay 23 and line $S_{29}$ shows the switching times for power switching device 29. First, relay 23 is closed at time $t_0$ when power switching device 29 is still open. Then, power switching device 29 is closed at time $t_1$, connecting the selected load 27 to the power source 21. At a time $t_2$, when it is desired to disconnect load 27 from power source 21, power switching device 29 is opened first, and then, at a later time $t_3$, relay 23 is opened. The other relays 22 and 24 are switched in the same manner as relay 23. As a consequence of this switching arrangement, the relays 22–24 need only be rated to pass the maximum voltage and current delivered to the load, and only the single power switching device 29 has to be rated to handle switching transients as a result of the making and breaking of contacts during power switching and has to have any necessary associated suppression circuitry *30*. Thus, significant cost savings in conjunction with substantially improved relay lifetime are achieved by following the principles of the present invention. Mechanical failure rather than contact failure becomes the major determinant of the lifetime of relays 22–24.

Figure 4:
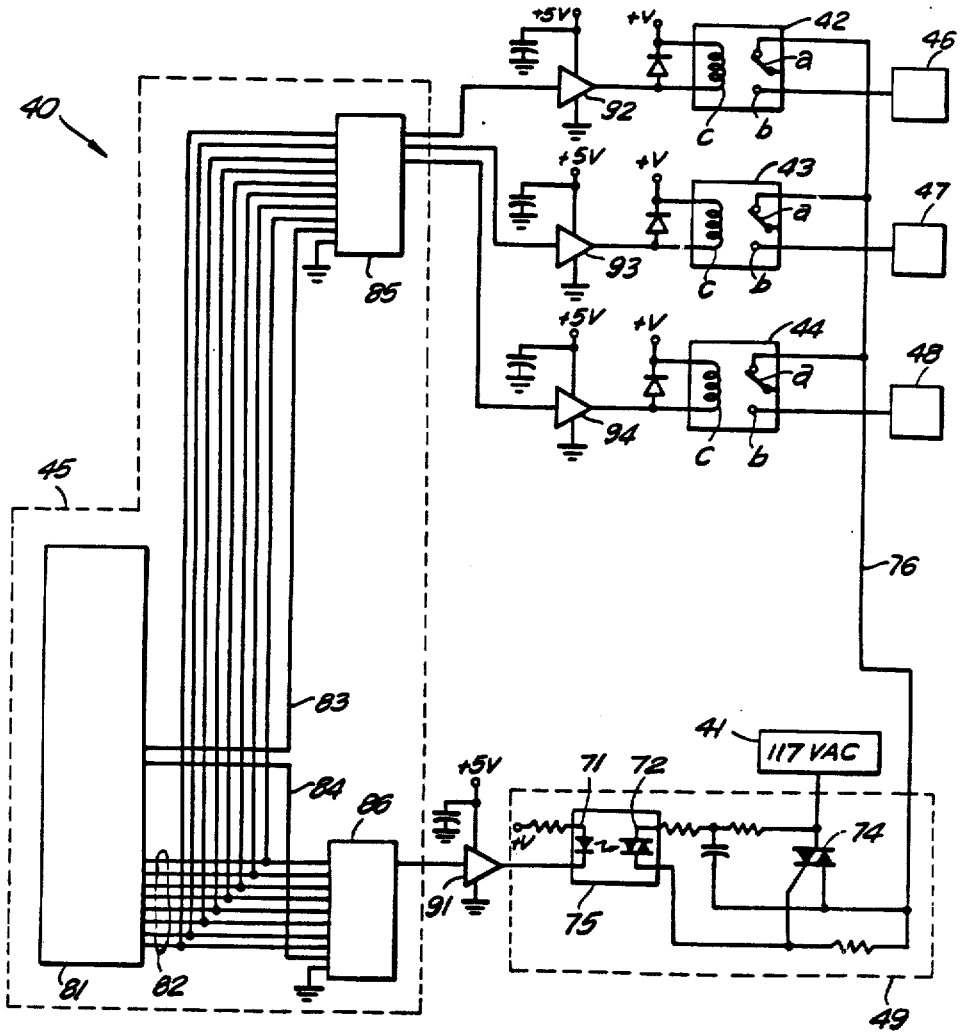
FIG. 4 is a schematic diagram of a first embodiment of vending machine power switching apparatus according to the present invention.

FIG. 4 shows a schematic diagram of a first embodiment of the present invention. The present invention concerns power switching apparatus for use in vending control means and vending machines whose functions are controlled by logic control means, such as TTL, LSI, microprocessor or other types of control circuit, and which have a plurality of relays for selecting among a plurality of loads, such as solenoids or dispensing motors, to be energized. The design of microprocessor control circuits and other types of controls for the wide variety of functions normally found in vending control means and vending machines is well within the capabilities of one skilled in the art. See, for example, U.S. Pat. No. 4,225,056, 4,231,105, 4,328,539, 4,354,613, 4,372,464 and 4,463,446. The invention is not limited to any particular type of control circuit or any particular function of an inductive load to which power is switched in a vending machine.

In the vending machine power switching apparatus 40 of FIG. 4, a 117 VAC power supply 41 is connected to a power switching means 49, which includes a triac 74 and an optical coupler 75. Other switching devices such as SCRs, relays, and any other power switching devices or circuits suitable for the particular application at hand are contemplated by the term power switching means. The power switching means 49 is connected by line 76 to one contact of each of a plurality of relays 42–44 which are shown in their normally open positions. Each of the relays 42–44 is connected to its respective load 46–48. Any load equivalent to those commonly found in vending machines is contemplated. A switching control means 45 is also connected to the power switching means 49 and to the relays 42–44 through a plurality of buffer/drivers 91–94 (each of the buffer/drivers may be one of the buffer/drivers from a Fairchild 7407 hex buffer/driver chip). The switching control means 45 includes a microprocessor 81, such as the Intel 8031. In a typical vending machine, a microprocessor, such as microprocessor 81, has a plurality of inputs and outputs other than those shown in FIG. 4 for monitoring and controlling the entire operation of the vending machine. Such details are not part of the present invention and are omitted to avoid obscuring the invention. Microprocessor 81, subject to its program control and its inputs (not shown), produces output signals which control the switching of the power switching means 49 and the relays 42–44. These output signals are connected through eight data bus lines collectively referred to as bus 82, and the lines 83 and 84, to a plurality of flip-flops designated collectively as 85 and 86 (which may suitably be National Semiconductor 74C374 octal three-state, non-inverting D-type flip-flop chips).

The output from one of the plurality of flip-flops 86 [control] *controls* the power switching device 49 via the buffer/drive 91. The power switching device 49 includes an opto-isolator 75 and a triac 74. It is used, as described in connection with FIGS. 2 and 3, to turn on and off the power to the switching contacts of relays 42–44.

The outputs of three of the plurality of flip-flops 85 control the relays 42–44 via buffer/drivers 92–94. The "a" contacts of the relays 42–44 are each connected in series with the output of the power switching device 49 via line 76, and the "b" contacts are connected to the respective loads 46–48. When one of the relays 42–44 is switched from its normally open position, it selects which of the loads 46–48 power is applied to. As described in the illustrative embodiment of FIGS. 2 and 3, for each switching event, the load to receive power is first selected by one of the relays 42–44 before power is applied by the switching device 49 and the power is turned off by the switching device 49 before the contacts of the selected relay 42–44 are opened again.

When an input signal is applied to one of the inputs of the buffer/drivers 92–94, current flows through the coil C of one of the relays 42–44 and the particular buffer/-driver. The current through the coil C causes the contacts a,b to move from their normally open position to their closed position.

After the load is selected, the appropriate input signal is applied to buffer/driver 91, its output goes low, current flows through the light emitting diode portion 71 of optical coupler 75, and current is allowed to flow through the photo-receptor portion 72 of optical coupler 75. As a result, triac 74 conducts and 117 VAC from the power supply 41 appears on line 76 and is applied, via the closed contacts of the previously selected relay to the selected load. When the power is to be removed from the selected load, the procedure is reversed, first deactivating the triac 74 to turn off the power and then deenergizing the relay to terminate the selection.

The switching control means 45 provides sequential output signals which switch the relays 42–44 in the appropriate order, as discussed in conjunction with FIG. 3. For example, where the loads 46–48 are dispensing motors for delivery of a product selected by the customer, once appropriate credit is established and a selection is made, the appropriate relay of the relays 42–44 is switched on to select a dispensing motor. Then, the power switching means 49 is turned on so that power is connected to the dispensing motor and a product is delivered. Next, after product delivery is actually sensed or after a sufficient time has elapsed for delivery to occur, power switching means 49 is turned off and power is disconnected from the motor. Finally, the appropriate selecting relay of the relays 42–44 is turned off.

While the embodiment above described has been discussed in terms of a preferred arrangement in which a single switching control means 45 controls both the power switching means 49 and the load selecting relays 42–44, separate control means could be used so long as the proper switching order is maintained.

Figure 5:
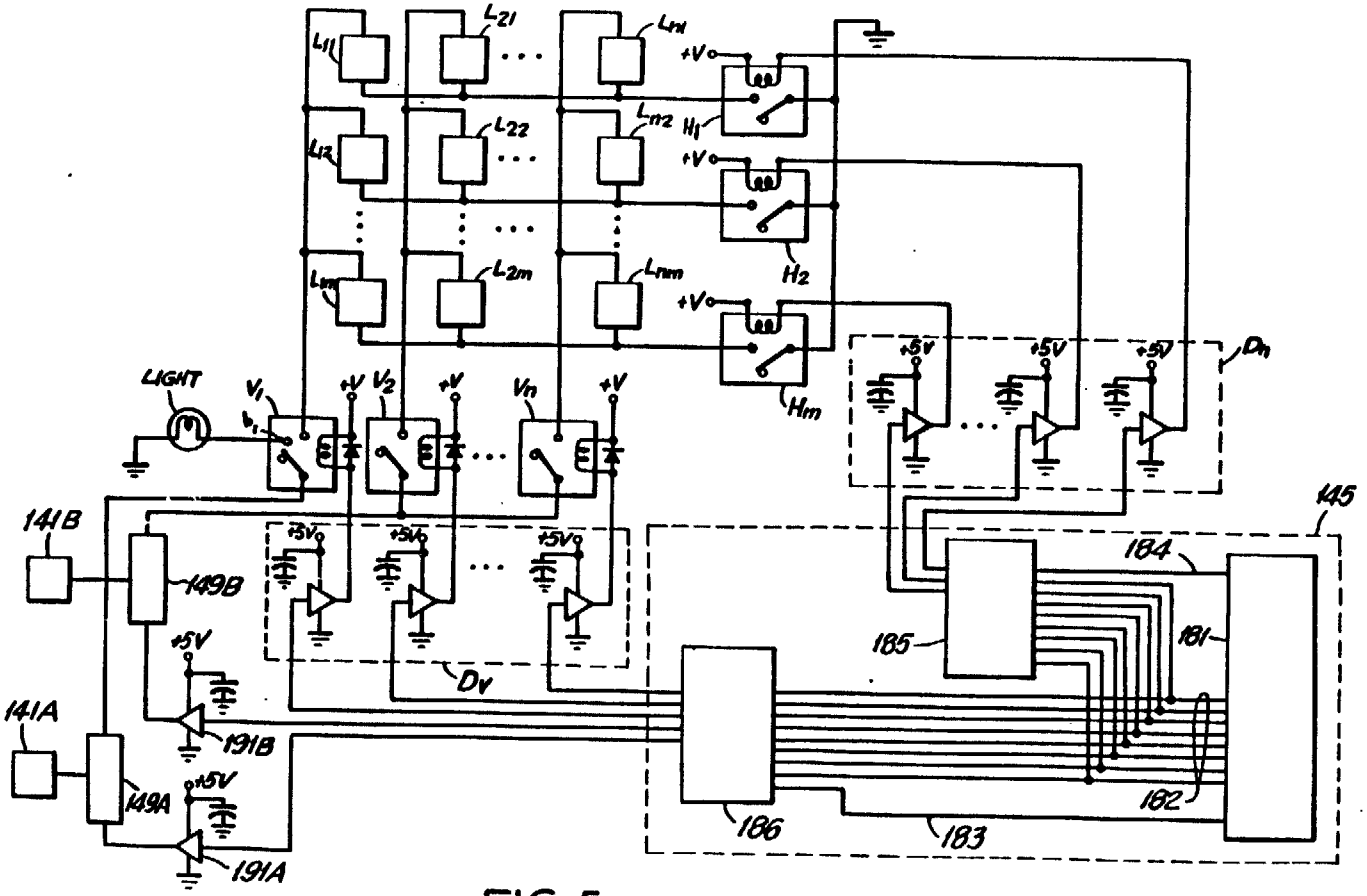
FIG. 5 is a schematic diagram of a second embodiment of vending machine power switching apparatus according to the present invention.

FIG. 5 is an embodiment illustrating the use of two power switching devices 149A and 149B in conjunction with a plurality of column selection relays $V_1$–$V_n$ in accordance with the present invention to permit the controlling of overlapping operations which do not begin and end at the same time. Separate power sources 141A and 141B are shown connected to power switching devices 149A and 149B in FIG. 5. It should be noted that where all the loads in the matrix have similar power requirements a single power source 149 (not shown) could be used to replace the two sources 141A and 141B. Similarly, if the loads are not to be concurrently operated, a single power switching device 149 (not shown) can replace the two devices 149A and 149B.

FIG. 5 also illustrates the use of a single power switching device with a plurality of column selection relays $V_2$–$V_n$ to control a plurality of loads, $L_{21}$–$L_{nm}$ such as dispensing actuators arranged in a matrix. Although product dispensing actuators are most commonly used in such a matrix, see, for example, U.S. Pat. No. 4,458,187 which is assigned to the assignee of the present invention, a matrix arrangement can also include other switched loads, such as a change dispenser or a light to indicate completion of dispensing. For example, in a $7\times10$ matrix having 7 columns and 10 row relays controlling up to 70 loads, 60 of the loads could be product dispensing actuators (this would correspond to loads $L_{21}$–$L_{nm}$ of FIG. 5 where $n=7$ and $m=10$) and the remaining ten loads could be involved in other vending machine functions (this would correspond to loads $L_{11}$–$L_{1m}$ where $m=10$).

The particular embodiment in FIG. 5 has a plurality of direct current actuated loads $L_{11}$–$L_{nm}$ arranged in a matrix. Commonly in such an arrangement, a diode (not shown) is used in association with each load to prevent alternative current paths and partial energization of nonselected loads. See, for example, U.S. Pat. No. 4,284,208. Each load is connected to one of a plurality of column selection relays $V_1$–$V_n$ and one of a plurality of row selection relays $H_1$–$H_m$. For example, load $L_{11}$ is connected to column relay $V_1$ and row relay $H_1$. Each of the column relays $V_1$–$V_n$ is connected to one of a plurality of column buffer/drivers collectively referred to in FIG. 5 as $D_v$. Similarly each of the horizontal relays $H_1$–$H_m$ is connected to one of a plurality of row buffer/drivers collectively referred to in FIG. 5 as $D_h$. The column relay $V_1$ is connected to the DC power source 141A through the power switching means 149A, and also connected to an indicator LIGHT with its $b_1$ contact. Relay $V_1$ illustrates a relay having a plurality of contacts. The column relays $V_2$–$V_n$ are connected to the second power source 141B through the power switching means 149B. A switching control means 145 includes various components and connections corresponding in operation to the similarly numbered components and connections of FIG. 4. For example, microprocessor 181 of FIG. 5 corresponds to microprocessor 81 of FIG. 4. The relays $V_1$–$V_n$ and $H_1$–$H_m$, and power switching means 149A and 149B are controlled by the control means 145 and operate as previously described in the discussion of FIG. 4 and the relays 42–44, power switching means 49, and control means 45 shown in FIG. 4.

Figure 6:
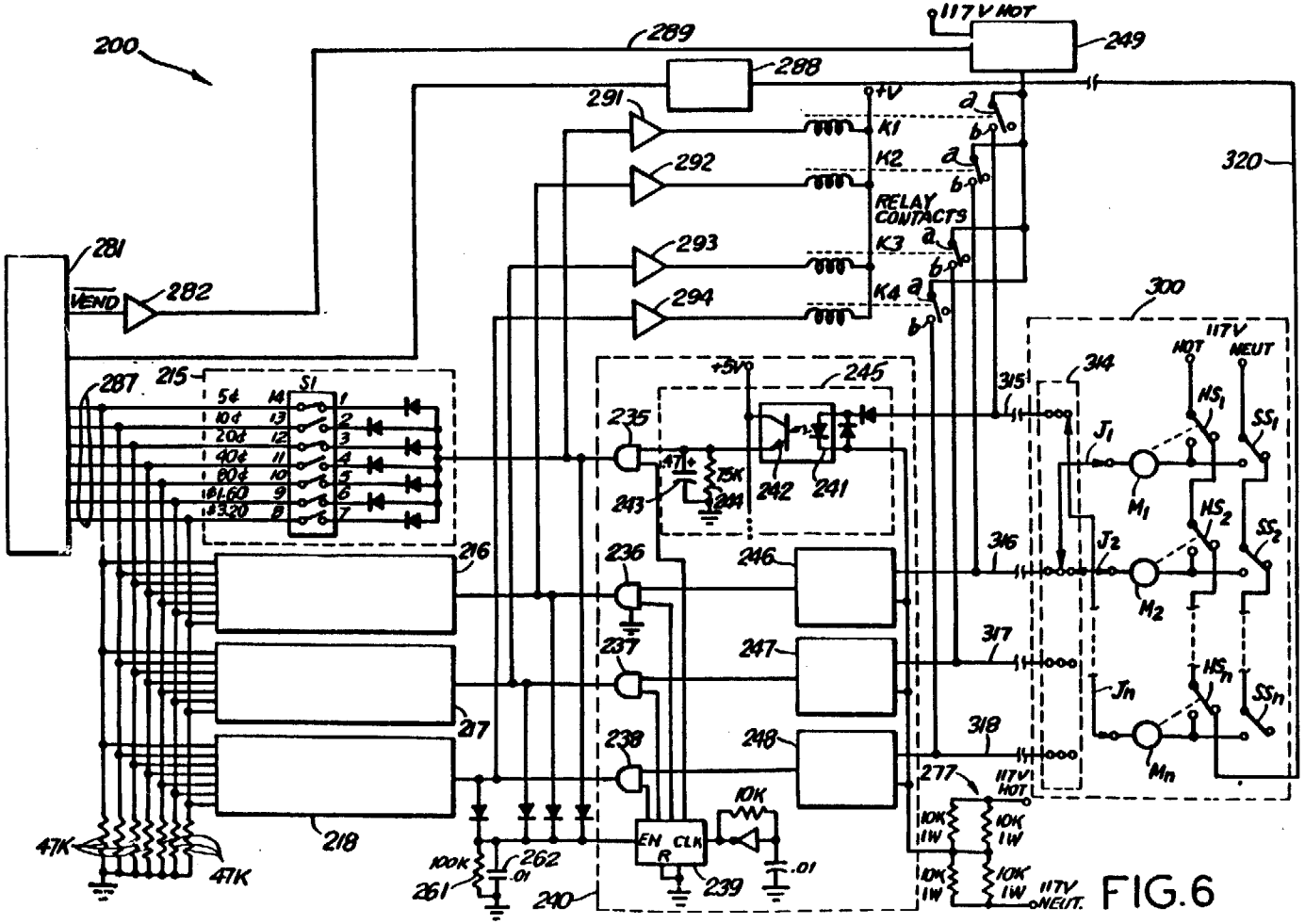
FIG. 6 is a schematic diagram of a third embodiment in which the present invention is employed in a vending control means.

FIG. 6 shows a third embodiment of the present invention, a price control apparatus 200 for inclusion within a vending control means or a coin mechanism. The price control apparatus 200 shown in FIG. 6 has a four price capacity; however, the same principles are applicable to various other numbers of prices. The price control apparatus 200 is shown in FIG. 6 as connected to a vending apparatus 300 by price selection lines 315–318. The vending apparatus 300 does not form a part of the present embodiment; therefore, only illustrative components are shown for the purpose of explaining the operation of the price control apparatus 200. Various vending apparatus employing a price selection line interface can be employed without departing from the present invention.

Each of the selection lines 315–318 in the price control apparatus 200 is connected to the input of an associated one of the optical coupler circuits 245–248. As shown in the case of optical coupler circuit 245, each of optical coupler circuits 245–248 typically includes a Motorola or equivalent type MCT6 optical isolator incorporating a light emitting diode (LED) 241 connected to the input and a photo-responsive device 242, optically coupled to the LED, at the output. The optical coupler circuit also includes an RC time constant circuit at its output comprising capacitor 243 and resistor 244.

The illustrative vending apparatus 300 includes a plurality of dispensing actuators, such as motors or solenoids, shown here as dispensing motors $M_1$–$M_n$, each with an associated selection switch $SS_1$–$SS_n$, and an associated holding switch $HS_1$–$HS_n$ which are connected and used in conventional fashion. Each of the motors $M_1$–$M_n$ may be connected by means of a plugboard 314 and moveable jumper wires $J_1$–$J_n$ to any one of the selection wires 315–318, depending on the price to be associated with the product dispensed by the motor. As shown in the case of motors $M_1$–$M_2$, more than one motor can be connected to a single selection line 316, in conventional fashion. When a selection switch, such as switch $SS_n$, is closed, current flows from a signal current source 277, comprising a voltage divider of resistors connected to the power line, through LED 241 of the optical coupler circuit 245, via the selection line 315 and jumper $J_n$, through motor $M_n$ and the closed selection switch $SS_n$ to the neutral power line. The current supplied by the signal power source 277 is insufficient to actuate the motors $M_1$–$M_n$.

When the signalling current flows in this fashion, the optical coupler circuit 245 associated with the selection line 315 produces a signal output which is transmitted to one input of an associated AND gate 235 of the AND gates 235–238. The other input of each of the AND gates 235–238 is connected to one of the outputs of a counter-decoder 239, typically a CMOS type 4017 device. The counter-decoder 239 sequentially transmits a pulse to each of the AND gates 235–238. If the other input of one of the AND gates, such as AND gate 235 in this example, is concurrently receiving a true signal, the pulse is passed by the AND gate and transmitted to the corresponding one of the price matrices 215–218, price matrix 215 in this case. The outputs of each of the AND gates 235–238 are also connected via diodes to the enable input of the counter-decoder 239 and an RC circuit comprising resistor 261 and capacitor 262 connected in parallel to ground. When one of the AND gates 235–238 produces an output, the capacitor 262 is charged. This charge inhibits the operation of the counter-decoder 239, causing it to send its output repeatedly to the same AND gate, thus locking that AND gate on and preventing the recognition of the other AND gates during the selection of one of the selection wires 315–318 or a resulting active vend cycle. The output of the selected AND gate, gate 235 in this case, is also connected to the associated one of the buffer-drivers 291–294, buffer-driver 291 in this case. A signal from the AND gate 235 through the buffer-driver 291 causes current to flow through the coil of the associated relay $K_1$, causing its previously open contacts a,b to close. This condition will continue so long as the selection switch $SS_n$ remains closed or a vend cycle is initiated and in progress. The closing of any one of the selection switches $SS_1$–$SS_n$ causes the closing of the one of the relays $K_1$–$K_4$ which is associated with the one of the selection lines 315–318 to which the actuated selection switch is connected, in the same manner as described for switch $SS_n$.

The optical coupler circuits 245–248, the RC time constant circuits, the AND gates 235–238 and the counter 239 comprise selection logic means 240 having a plurality of outputs, here four outputs are shown.

Each of the price matrices 215–218 has a single input and, in this embodiment, seven outputs. As shown in the case of price matrix 215, the input of each of the price matrices 215–218 is connected to a plurality of diodes. The other side of each of the diodes is connected to one of seven switches comprising a DIP switch $S_1$. The outputs of the switches of each of the price matrices 215–218 are connected to the coin mechanism's microprocessor 281 via bus 287. The closing of various combinations of the switches $S_1$ connects the input of the price matrix to selected outputs, and conveys the price set by advance setting of the switches in binary form to the microprocessor 281 when the price matrix in question receives an input signal. Typically, the binary units correspond to five cents (5¢) and the values indicated to the microprocessor 281 by closing the various switches are as shown in connection with price matrix 215 in FIG. 6. For example, as shown in FIG. 6, to indicate 25¢, the first (5¢) and third (20¢) switches are closed. Thus, if these switches were closed in price matrix 215 when selection switch $SS_n$ was closed, the microprocessor 281 would be informed that a 25¢selection had been made.

When the microprocessor 281 is informed of the price selection, it compares the price with the customer's credit in conventional fashion. If there is enough credit and all other conditions programmed into the microprocessor 281 have been satisfied, the microprocessor 281 produces a $\overline{\text{VEND}}$ signal which is transmitted by a buffer-driver 282, via wire 289 to the power switching means 249, which may have the same circuit as the power switching means 49 of FIG. 4. When actuated, power switching means 249 connects the hot side of the 117 volt power line to the contacts "a" of each of the relays $K_1$–$K_4$, which—when closed to the corresponding contact "b"—apply power to the selected motor. [This] *Thus* both starts the motor and maintains the light-emitting diode in the corresponding optical coupler circuit "on" during the vend cycle. In the arrangement shown in FIG. 6, after one of the motors $M_1$–$M_n$ is started, a cam on the motor shaft maintains the associated one of the holding switches $HS_1$–$HS_n$ closed until the motor has completed its cycle.

As long as one of the series connected holding switches $HS_1$–$HS_n$ is connecting power to one of the motors $M_1$–$M_n$, the connection from the hot side of the power line to the blocker line 320 of the vending machine 300 is open, and no power is applied to the blocker line. The opening of the holding switch from the motor contact by the motor cam at the conclusion of the motor's cycle completes the circuit connecting power to the blocker line 320, transmitting a signal to the microprocessor 281 via an isolation device 288, such as a relay or an opto-isolator circuit. This blocker signal informs the microprocessor 281 that the vend cycle is completed and the microprocessor 281 signals the power switching device 249 via the buffer-driver 282 to deactivate. This removes power from the contacts a of the relays $K_1$–$K_4$ and consequently deactivates the previously activated optical coupler. The output of each of the optical coupler circuits includes an RC circuit such as the capacitor 243 and resistor 244 shown in connection with optical coupler circuits 245. In one embodiment, these RC circuits have a time constant of about 30 msec. The capacitor 243 of the RC circuit shown maintains the output of its optical coupler circuit 245 for the period of the time constant before terminating the activation of the associated one of the AND gates 235, which turns off the selected relay and turns off the signal which had been inhibiting the sequential distribution of pulses to the AND gates 235–238 by the counter-decoder 239. Once this has occurred, the price control apparatus 200 is ready for another cycle.

I claim:

1. An improved vending machine power switching apparatus comprising:

a plurality of relays for selecting which of a plurality of loads in a vending machine is to be energized, each of said relays having a coil and one set of switching contacts;

a power switching means connected in series with the switching contacts of each of the plurality of relays, said power switching means selectively controlling whether power is connected to the switching contacts of said relays;

each of said relays being associated on a one-to-one basis with a corresponding one of said loads so that when the power switching means connects power to the switching contacts of said relays, power flows through only one set of switching contacts, and the failure of the contacts of any one of said relays only prevents the selection of its associated load; and an electronic switching control means having an output for producing electrical control signals connected to each of the coils of each of the plurality of relays for controlling the switching of the relays by producing the appropriate electrical control signals so that a relay is switched so as to select its associated load for energization only when the power switching means has disconnected power from the relay's switching contacts and a relay switch is switched to terminate the selection of its associated load only when the power switching means has previously disconnected power from the relay's switching contacts, whereby improved relay switching contact reliability is achieved.

2. The apparatus of claim 1 wherein the electronic switching control means is also connected to the power switching means, said electronic switching control means controlling the power switching means so that power is connected to the switching contacts of each of the plurality of relays after any one of the relays is switched so as to select its associated load, and power is disconnected from said switching contacts prior to the termination of the selection of any of the plurality of loads by its corresponding relay.

3. The apparatus of claim 1 or 2 wherein the electronic switching control means includes a programmed microprocessor control circuit.

4. The apparatus of claim 1 or 2 wherein the loads are inductive and [the plurality of relay switches] *the relays' switching contacts* are rated to handle the approximate steady state current drawn by the load, but are rated to handle less than the current which would be drawn in switching current to that load.

5. The apparatus of claim 1 or 2 wherein the power switching means comprises a semiconductor switching means.

6. The apparatus of claim 5 wherein the [power] *semiconductor* switching means comprises a triac.

7. The apparatus of claim 1 or 2 wherein the plurality of loads are connected in a matrix.

8. The apparatus of claim 1 further comprising a second plurality of relays for selecting which of a second plurality of loads is to be energized, each of the second plurality of relays having at least one set of switching contacts;

a second power switching means connected in series with the switching contacts of each of the second plurality of relays, said second power switching means controlling the power which is connected to the switching contacts of said second plurality of relays and wherein the electronic switching control means is connected to each of the second plurality of relays so that the second plurality of relays are switched in the same manner as the first plurality of relays whereby one load from each of the two plurality of loads may be simultaneously energized.

9. The apparatus of claim 1, 2 or 8 wherein at least one of the relays has a plurality of sets of switching contacts, and each of said sets of switching contacts is connected to only a single associated load.

10. An improved vending control means including a plurality of selection lines;

a selection logic means connected to the plurality of selection lines and having a plurality of outputs at which appropriate electrical control signals are produced, each of the plurality of outputs corresponding to a respective one of the plurality of selection lines;

a plurality of price setting means, each of the plurality of price setting means connected to a respective one of the plurality of outputs of the selection logic means, said price setting means producing output price data on their outputs;

control means connected to the outputs of the price setting means for producing a vend control signal when vending conditions are satisfied, characterized by, a plurality of relays each having a coil connected to a respective one of the plurality of outputs of the selection logic means, each of the relays having at least one set of switching contacts, said switching contacts of each of the relays being connected to a respective one of the selection lines, so that the relays, in response to whether current flows in their respective coils as a result of the output signals at their respective selection logic means outputs, control which of the selection lines is to be energized;

a power switching means connected in series with the switching contacts of each of the plurality of relays, said power switching means selectively controlling whether power is connected to or disconnected from the switching contacts of the relays;

the power switching means being connected to the vend control signal from the control means and controlled thereby such that a relay is switched to select its respective selection line for energization only when the power switching means has disconnected power from the relay's switching contacts, and a relay [switch] is switched to terminate the selection of its associated selection line only when the power switching means has previously disconnected power from the relay's switching contacts.

11. An improved vending control means according to claim 10 wherein the selection logic means further comprises:

for each selection line, a time delay circuit connected to receive a signal indicative of the activation state of the selection line and connected to control the activation of the relay associated with said selection line, whereby the time delay circuit delays the deactivation of the associated relay for a period after the deactivation of its associated selection line.

*12. An improved vending machine power switching apparatus comprising:*

*a plurality of individually selectable loads;*

*a plurality of load switch means each connectable in a separate series circuit with an associated load to define a plurality of separate series circuits;*

*means connecting said separate series circuits in a parallel circuit with one another to define a loading circuit;*

*a controllable power switching means connected in series with said loading circuit, whereby each of said load switch means is connected in a separate series circuit with said power switching means; and*

*control means for controlling the actuation and deactuation of said power switching means and of said plurality of load switch means, said control means effecting actuation and de-actuation of said load switch means only when the power switching means is in a de-actuated condition.*

*13. Means for suppressing noise in a switchably energizable vending machine load circuit that includes a plurality of individually selectable inductive loads comprising a plurality of load switch means each connectable in a separate series circuit with a respective inductive load to define a plurality of separate series circuits, means connecting said separate series circuits in parallel circuit with one another to define a loading circuit portion, a controllable power switching means connected in series with said loading circuit portion, whereby each of said load switch means is connected in a separate respective series circuit with said power switching means, first noise suppression means connected to said power switching means; and control means for controlling the actuation and de-actuation of said power switching means and of said plurality of load switch means, said control means effecting actuation and de-actuation of said load switch means only when the power switching means is in a de-actuated condition.*

*14. The means of claim 13 wherein said control means includes a programmable processing means for controlling the application of power to a selected inductive load, said processing means programmed to sequentially*

*(a) produce a load switch actuation control signal to actuate the load switch means that is connected in said separate series circuit with the selected inductive load;*

*(b) produce a power switching means actuation control signal to actuate said power switching means;*

*(c) produce a power switching means de-actuation control signal to de-actuate the power switching means; and*

*(d) produce a load switch means de-actuation control signal to de-actuate the actuated load switch means.*

*15. The means of claim 14 wherein the inductive loads are vend delivery means each capable of performing a vend delivery operation when sufficient power is applied thereto and wherein step (c) includes the step of delaying production of a power switching means de-actuation control signal for a sufficiently long enough time period following step (b) to permit the vend delivery means to which power is applied to perform a vend delivery operation.*

*16. The means of claim 14 wherein the inductive loads are vend delivery means capable of performing a vend delivery operation when sufficient power is applied thereto and wherein step (c) includes the step of verifying the performance of a vend delivery operation prior to production of a power switching means de-actuation control signal.*

*17. The means of claim 13 wherein said load switch means are relays and said power switching means are semiconductor switching means.*

*18. Means for suppressing noise in a vend delivery circuit of a vending system wherein the vend delivery circuit includes a plurality of switchably energizable individually selectable vend delivery means and wherein the vending system includes a control means capable of producing sets of selection control signals for selecting and de-selecting the individual vend delivery means and a power control set of signals for controlling the switchable energization and de-energization of a selected vend delivery means, the control means being further capable of producing such sets of control signals in a sequential order wherein the power control set of signals are produced subsequent to the production of a control signal selecting a vend delivery means and prior to the production of a signal de-selecting such vend delivery means, said means for suppressing noise further comprising a plurality of load switch means each connectable in a separate series circuit with a respective vend delivery means to define a plurality of separate series circuits, means connecting said separate series circuits in parallel circuit with one another to define a loading circuit portion, controllable power switching means connected in series with said loading circuit portion, whereby each of said load switch means is connected in a separate respective series circuit with said power switching means, and first noise suppression means connected in common with said loading circuit portion, each said load switch means connected to be responsive to a set of selection control signals and said power switching means connected to be responsive to the power control set of signals.*

*19. The means of claim 18 wherein said load switch means are relays and said power switching means are semiconductor switching means.*

*20. A method for suppressing noise during the switchable energization and de-energization of a vending machine load circuit that includes a plurality of individually selectable inductive loads comprising*

*(a) providing circuit means including a plurality of actuatable load switch means, each connected in a separate series circuit with a respective inductive load to define a plurality of separate series circuits, means connecting said separate series circuits in parallel circuit with one another to define a loading circuit portion, an actuatable power switching means connected in series with said loading circuit, whereby each*

*of said load switch means is connected in a separate respective series circuit with said power switching means, and first noise suppression means connected to said power switching means;*

*(b) actuating the load switch means connected in separate series circuit with the selected load;*

*(c) actuating said power switching means;*

*(d) de-actuating said power switching means; and*

*(e) de-actuating the load switch means actuated in step (b).*

*21. The method of claim 20 wherein the circuit means further includes a control means operable for controlling the actuation and de-actuation of said load switch means and said power switching means.*

*22. The method of claim 20 wherein the inductive loads are vend delivery means each capable of performing a vend delivery operation when sufficient power is applied thereto and wherein step (d) includes the step of delaying for a sufficiently long enough period following step (c) to permit the vend delivery means to which power is applied to perform a vend delivery operation.*

*23. The method of claim 20 wherein the inductive loads are vend delivery means each capable of performing a vend delivery operation when sufficient power is applied thereto and wherein step (d) includes the step of verifying the performance of a vend delivery operation prior to de-actuating said power switching means.*

*24. A method for energization and de-energization of loads in a vending machine load circuit that comprises a plurality of individually selectable inductive loads, a plurality of actuatable load switch means each connected in a separate series circuit with a respective load to define a plurality of separate series circuits, means connecting said separate series circuits in parallel circuit with one another to define a loading circuit, and an actuatable power switching means connected in series with said loading circuit, whereby each of said load switch means is connected in a separate respective series circuit with said power switching means; the method comprising the following sequence of steps:*

*(a) actuating the load switch means connected in separate series circuit with the selected load;*

*(b) actuating said power switching means;*

*(c) de-actuating said power switching means; and*

*(d) de-actuating the load switch means actuated in step (a).*

* * * * *

UNITED STATES PATENT AND TRADEMARK OFFICE

CERTIFICATE OF CORRECTION

PATENT NO. : Re. 33,314

DATED : August 28, 1990

INVENTOR(S) : Cowles

It is certified that error appears in the above—identified patent and that said Letters Patent is hereby corrected as shown below:

Column 3, line 23, replace "reserve" with --respective--.

In the Claims:

Claim 13, column 11, line 55, replace ";" with --,--.

Signed and Sealed this

Nineteenth Day of May, 1992

*Attest:*

DOUGLAS B. COMER

*Attesting Officer*

*Acting Commissioner of Patents and Trademarks*